Feb. 8, 1944.  N. ERLAND AF KLEEN  2,340,886
THERMOSTAT VALVE OPERATING MECHANISM FOR
ABSORPTION REFRIGERATING APPARATUS
Filed June 13, 1940   2 Sheets-Sheet 2
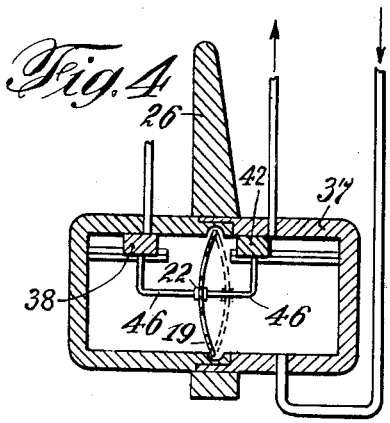
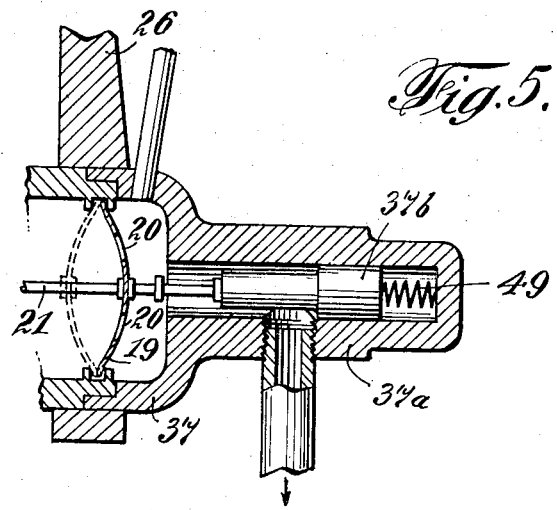
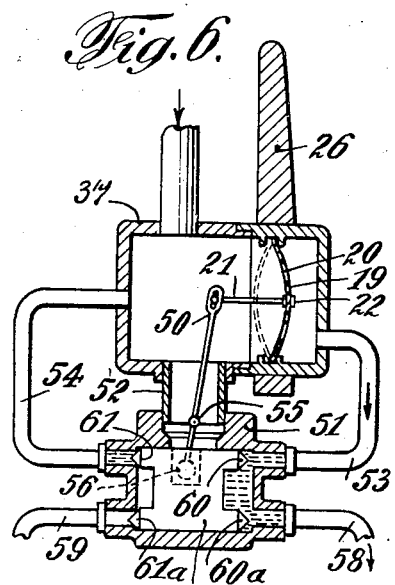
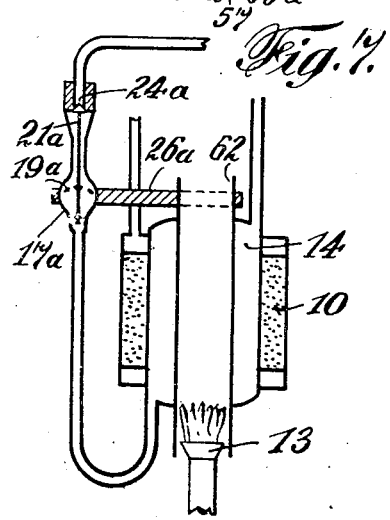
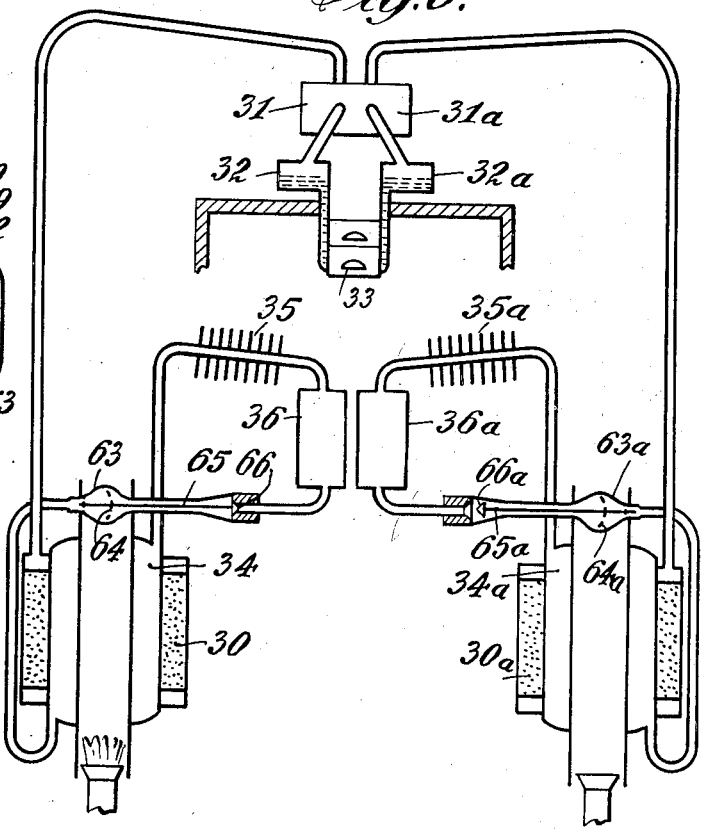
INVENTOR.
Nils Erland af Kleen
By C. P. Goepel
his ATTORNEY.

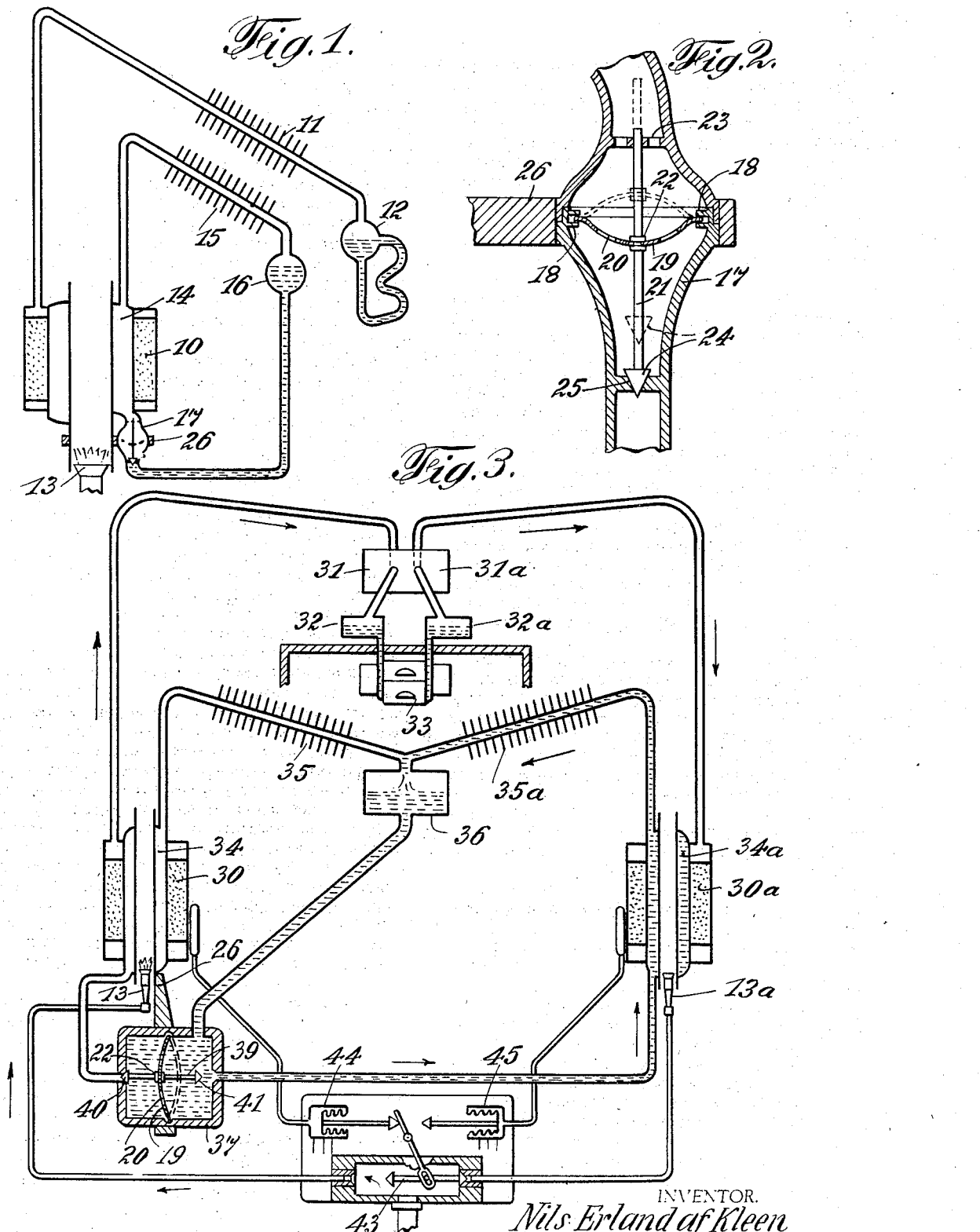

Patented Feb. 8, 1944

2,340,886

UNITED STATES PATENT OFFICE 2,340,886

THERMOSTAT VALVE OPERATING MECHANISM FOR ABSORPTION REFRIGERATING APPARATUS

Nils Erland af Kleen, Stockholm, Sweden, assignor to Kleen Refrigerator, Inc., Hoboken, N. J., a corporation of Delaware Application June 13, 1940, Serial No. 340,291

6 Claims. (Cl. 62—5)

The present invention relates to new and useful improvements in automatic valve mechanism for use in absorption refrigerating apparatus and is directed more particularly to a thermostat valve arrangement for controlling the flow of a fluid used to cool the boiler absorber of the refrigerating system.

In absorption refrigerating apparatus of the intermittent type, the boiler absorber is intermittently heated (expulsion phase) by any suitable exterior heating means, and alternately cooled (absorption phase) by a cooling fluid circulating through a closed system. It therefore becomes necessary to provide automatic valve mechanisms for controlling the flow of the cooling fluid during the two phases of operation of the refrigerating apparatus. Heretofore various automatic valve mechanisms have been used for this purpose, but due to their slowness of operation and complicated structure, the efficiency of the refrigerating apparatus was materially reduced.

It is therefore the object of the present invention to overcome these disadvantages and to provide a valve operating mechanism which is simple in construction and quick acting, thereby overcoming the disadvantages in the devices heretofore used.

The invention resides in providing a valve operating mechanism disposed within the closed cooling fluid system of the absorption refrigerating apparatus and consists of a bi-metallic diaphragm of the snap-action type movable to two positions to open and close, respectively, the valve or valves in the cooling fluid supply lines, said bi-metallic diaphragm being responsive to the direct heat applied to the boiler absorber; the diaphragm also being perforated to permit free communication of the cooling fluid from one side of the diaphragm to the other to equalize the pressure on both sides thereof.

The present invention also contemplates a valve operating mechanism of this character for use in connection with absorption refrigerating apparatus employing two units intermittently and alternately operable in the expulsion and absorbing phases, and wherein the flow of cooling fluid to the respective absorbers is controlled by a common valve operating mechanism. Furthermore the valve operating mechanism may be located at any point in the cooling system but responsive to heat supplied to any one of the boiler absorbers.

The invention will be more fully described hereinafter, embodiments thereof being shown as examples in the drawings and finally pointed out in the claims.

Referring to the drawings, in which numerals of like character designate similar parts throughout the several views, Fig. 1 is a diagrammatic view, partly in section, showing a single refrigerating unit and a cooling system for the absorber and including one form of valve operating mechanism contemplated by the present invention disposed below the absorber;

Fig. 2 is an enlarged horizontal section through the valve operating mechanism shown in Fig. 1;

Fig. 3 is a diagrammatic view partly in section showing an absorption refrigerating apparatus including two units adapted to be cooled by a common fluid system and showing the improved double valve operating mechanism in the circuit of the cooling system for selectively controlling the circulation to the respective absorbers;

Fig. 4 is an enlarged horizontal sectional detail of the valve operating mechanism applied to a modified form of valve assembly;

Fig. 5 is a view similar to Fig. 4 but showing the mechanism applied to another form of valve assembly;

Fig. 6 is a similar view showing a further modified form of valve assembly;

Fig. 7 is a fragmentary detail view partly in section showing a valve and valve operating mechanism similar to that illustrated in Fig. 1, but disposed adjacent the top and to one side of the boiler absorber, and Fig. 8 is a view similar to Fig. 3 but wherein each boiler absorber is cooled by a separate fluid system and showing two valves and their operating mechanisms, one for each cooling system, said mechanisms being disposed horizontally across the top of the respective boiler absorbers.

In the drawings, referring more particularly to Fig. 1, there is illustrated diagrammatically an absorption refrigerating apparatus having the usual boiler absorber 10 containing the absorbent, a condenser 11, and evaporator 12, all connected together by suitable pipes or conduits to form a closed circulating system (or primary circuit) for the refrigerant. The boiler absorber is heated from any suitable exterior source, such for example as a gas burner 13 to drive out the absorbed refrigerant from the boiler absorber in what is known as the expulsion phase of the unit. During the absorption phase of the apparatus the source of heat is shut off by any suitable thermostat means (not shown) and the boiler absorber is cooled by a cooling fluid circulating in a secondary circuit formed by an inwardly spaced jacket 14 in the boiler absorber 10, a condenser 15 and a collecting tank 16, all connected together by suitable pipes.

Interposed in this secondary circuit is the improved valve operating mechanism forming the subject-matter of the present invention, and consists as shown in Fig. 2 of a valve casing 17, provided with an inner circumferentially slotted ring 18 adapted to support the peripheral edges of a thermostat member in the form of a bi-metallic diaphragm disc 19 of the snap-action type. In order to maintain the pressure equal on both sides of this diaphragm, openings 20 are provided to permit the free passage of cooling fluid from one side of the diaphragm to the other. A rod 21 extends through an opening in the central portion of the disc 19 and is secured therein by means of a collar 22, as shown in Fig. 2, whereby said rod will move with the disc. One end of the rod is guided in the bore of a spider or yoke member 23 in the casing 17 and the opposite end of the rod terminates in a valve 24 which, in the form illustrated, is preferably cone-shaped and cooperates with a valve seat formed in the partition 25 supported in the valve casing 17.

Surrounding the valve casing 17 adjacent the slotted ring 18 is a heat conductor 26 which has an extension or projection lying in close proximity to the burner 13 so that the heat of the flame will be conducted to the bi-metallic disc 19 to control the operation of the latter. It will of course be understood that the structure and composition of the disc 19 are predetermined so that when heated, said disc will snap into one position as shown in full lines in Fig. 2, to close valve 24, and when the temperature drops a few degrees, said disc will snap into its other position shown in dotted lines in Fig. 2 to open valve 24.

Having described one form of thermostat valve for controlling the cooling fluid employed to cool the boiler absorber of an intermittent absorption refrigerating system, its operation is as follows:

Assuming that the burner 13 has just been turned on for the expulsion phase operation of the refrigerating unit, the heat transmitted through conductor 26 to the disc 19 has caused the latter to snap to its full line position in Fig. 2 to close valve 24. During this period of operation of the refrigerating unit, the refrigerant is driven out of the boiler absorber 10, passes to the condenser 11 and is delivered to the evaporator 12 (Fig. 1). When the burner 13 is turned off at the end of the expulsion phase by any suitable means (not shown), the temperature drop through the conductor 26 causes disc 19 to snap to the dotted line position shown in Fig. 2 to open valve 24 and permit the circulation of the cooling fluid through the secondary system to cool the boiler absorber 10. During this period, the refrigerant evaporating in the evaporator 12 will return to the boiler absorber 10 to be absorbed by the absorbent, and when the burner 13 is again turned on for the next expulsion phase operation of the unit, the heat transmitted through conductor 26 to the disc 19 will again snap the latter to the full line position to repeat the cycle just described.

Referring to Fig. 3 there is shown the improved valve operating mechanism applied to an absorption refrigerating apparatus operating with two units whose boiler absorbers are intermittently and alternately heated for the expulsion phase and afterwards cooled for the absorption phase. In this form of my invention the refrigerant circulates through separate closed circuits formed by boiler absorbers 30, 30a, condensers 31, 31a, and evaporators 32, 32a located in the top of an ordinary ice-box provided with the usual ice-trays 33. The cooling fluid system for the respective boiler absorbers circulates through the cooling jackets 34, 34a, condensers 35, 35a, common collecting tank 36 and a common valve chamber 37. In this form of my invention the bi-metallic diaphragm 19 is disposed centrally in the valve chamber 37 and the valve rod 39 carried thereby has valve members 40 and 41 on each end of the rod. These oppositely disposed valves 40 and 41 cooperate with valve seats provided in the side walls of the valve chamber 37 to control the circulation of the cooling fluid to the respective boiler absorber jackets 34, 34a. As in the case of the form illustrated in Fig. 2, the bi-metallic disc diaphragm 19 has openings 20 to permit free communication of the cooling fluid from one side of the diaphragm to the other, and the disc is actuated by the heat transmitted through the conductor 26 which encircles the valve chamber 37 and has a projection extending in close proximity to the burner 13 of the boiler absorber 30.

The gas supplied to the burners 13 and 13a in this form of my invention is regulated by a suitable double valve mechanism 43 controlled by impulse bodies 44 and 45 in heat relationship with the respective boiler absorbers 30 and 30a.

The operation of the apparatus just described is as follows:

During the heating of the boiler absorber 30 by burner 13 for the expulsion phase operation of the unit shown in the left hand side of Fig. 3, the heat transmitted from said burner to the disc 19 through the conductor 26 will maintain valve 40 closed and valve 41 open to permit the circulation of the cooling liquid from tank 36 to the jacket 34a to cool boiler absorber 30a for the absorption phase of the unit shown at the right hand side of the figure. When the desired amount of heat has been supplied to the boiler absorber 30, the valve mechanism 43 will be shifted by the impulse body 44 to shut off the burner 13 and turn on burner 13a. The temperature drop through the conductor 26 occasioned by shutting off the burner 13 will cause disc 19 to snap to the position shown in dotted lines in Fig. 3, closing valve 41 and opening valve 40 to permit the circulation of the cooling liquid from the tank 36 to the jacket 34 to cool the boiler absorber 30 for the absorption phase of the corresponding unit. As soon as the desired temperature is attained in boiler absorber 30a, the impulse body 45 will operate to shift the valve mechanism 43 to the position shown in Fig. 3, shutting off burner 13a and turning on burner 13, and the heat transmitted through conductor 26 will then snap disc 19 to its full line position, closing valve 40 and opening valve 41.

It will thus be seen that in this form of the invention, the disc 19 responsive to the heat supplied to only one boiler absorber selectively controls the circulation of the cooling medium to a plurality of boiler absorbers of respective units operating in alternate phase relation to one another.

In the modified form of valve mechanism shown in Fig. 4 the bi-metallic disc 19 actuated by the conductor 26 operates a valve rod 46 whose opposite ends are bent and support valve members 38 and 42 adapted to slide against the inner wall of the chamber 37 to control the flow of cooling fluid in the conduits leading from the chamber to the respective boiler absorber jackets (not shown), and the operation of this device will be obvious without further description.

In Fig. 5 the bi-metallic disc 19 in the casing 37 in thermal contact with the conductor 26 operates a modified form of valve disposed in an extension 37a of the casing 37. This valve comprises an enlarged body member 37b secured to one end of the valve rod 21 and is slidable in the bore of the casing extension 37a. A spring 49 interposed between the end of the bore and the valve body 37b normally urges the valve toward its closed position and the disc 19 operates against the tension of this spring to open the valve. The operation of this form of my invention will be obvious from the foregoing description thereof.

In that form illustrated in Fig. 6, the bi-metallic disc 19 disposed in the chamber 37 in thermal contact with the conductor 26 operates the rod 21 which in turn is pivotally connected to the upper end of a valve operating lever 50. In this modification the valves do not operate in the chamber 37 but are disposed in an auxiliary valve casing 51 in communication with said chamber 37 by means of a central coupling member 52 and by-pass conduits 53 and 54 leading from the chamber 37 on each side of the disc 19 into opposite sides of the auxiliary casing 51. The valve operating lever 50 is pivoted on a suitable transverse pin or the like 55 supported in the coupling member 52, its lower end terminating in a ball member 56 which cooperates with a complementary socket formed on the upper portion of a valve block 57 slidably mounted in the auxiliary casing 51. Bypass conduits 53 and 54 leading from opposite sides of chamber 37 terminate in each side of the auxiliary casing 51 adjacent the upper portion thereof, and the outlet pipes 58 and 59 for the cooling fluid leading to the respective absorbers extend from opposite sides of the lower portion of casing 51.

One side of the valve block 57 has a pair of valves 60 and 60a adapted to cooperate with respective valve seats formed in the casing 51 adjacent the conduits 53 and 58, respectively, and the opposite side of the valve block 57 carries a similar pair of valves 61 and 61a cooperating with respective valve seats in the casing for the conduits to pipes 54 and 59, respectively. Thus, in this modified form of the invention, two sets of valves are operated by the disc 19 and the operation of the entire assembly is the same as that heretofore described.

The device of Fig. 7 is very similar to that of Fig. 1 and includes a valve casing 17a in which is transversely disposed the bi-metallic disc 19a, operating valve rod 21a, which carries the conical valve member 24a cooperating with the valve seat formed in the casing. However, in this form, the device is disposed to one side of the boiler absorber 10 and above the same, and the conductor 26a for the bi-metallic disc is in thermal contact with the flue 62 for the hot gases from the burner 13 instead of being adjacent the flame of the gas burner. The operation of this device is the same as previously explained in connection with Figs. 1 and 2.

The refrigerating apparatus shown in Fig. 8 is similar to that heretofore described in connection with Fig. 3 and consists of two units including boiler absorbers 30, 30a, condensers 31, 31a and evaporators 32, 32a forming two closed circulating systems for the refrigerant. The apparatus also includes two secondary cooling circuits comprising boiler absorber jackets 34, 34a, condensers 35, 35a, and collecting tanks 36, 36a, connected by the usual pipes and providing two closed systems for the circulation of a cooling fluid. In each of these closed cooling systems there is interposed a valve and valve operating mechanism in accordance with the present invention and each comprises a casing 63, 63a, in which is disposed a bi-metallic disc 64, 64a, operating a valve rod 65, 65a provided at one end with a valve 66, 66a cooperating with a respective valve seat to control the flow of cooling fluid to the boiler absorber jackets 34 and 34a, respectively.

In this form of the invention the casings 63 and 63a are arranged transversely across the upper portion of the respective boiler absorbers 34 and 34a with the bi-metallic discs 64 and 64a in the path of travel of the hot gases passing upwardly through the stack in each boiler absorber, thereby eliminating the use of the conductor 26. The operation of this device is believed obvious without the necessity of further explanation.

It will thus be seen that with the present invention the supply of cooling fluid to the boiler absorber or boiler absorbers will be effectively controlled by the bi-metallic disc arrangement in thermal contact either with the flame of the burner for the absorber, or the hot gases of combustion from said burners. Furthermore, the bi-metallic disc is disposed entirely within the cooling system and operates in the cooling fluid of the system, and due to the apertures or openings provided in said disc, the pressure on both sides thereof will be equalized so that said disc will not operate against any pressure.

While in the foregoing description reference has been made to absorption and absorbent, it is to be understood that these terms are meant to include adsorption and adsorbent, and that the valves and valve operating mechanism hereinabove described will operate with equal efficiency in an adsorbent system.

From the foregoing it is believed that the construction and advantages of the present invention may readily be understood by those skilled in the art without further description, and that numerous changes may be made in the details disclosed without departing from the spirit of the invention as set out in the following claims.

What I claim is:

1. In absorption refrigerating apparatus of the intermittent type including a plurality of units operating in alternate phase relation to one another, each unit having a boiler absorber adapted to be intermittently heated and alternately cooled during the corresponding generating and absorbing periods thereof; the combination with means for intermittently heating each of said boiler absorbers in alternate phase relation to one another, and fluid cooling means for cooling said boiler absorbers; of valve means for controlling the flow of cooling fluid to each of said boiler absorbers, and a bi-metallic thermostat member in thermal transfer relation to the heat supplied by said heating means to only one of said boiler absorbers and operatively connected to said valve means to control the cooling of each of said boiler absorbers intermittently and in phase relation to the heating thereof.

2. In absorption refrigerating apparatus of the intermittent type including a plurality of units operating in alternate phase relation to one another, each unit having a boiler absorber adapted to be intermittently heated and alternately cooled during the generating and absorbing periods, respectively, thereof, and means for intermittently heating each of said boiler absorbers in alternate phase relation to one another; the combination with a secondary cooling system for the circulation of a cooling medium in heat exchange relation with each of said boiler absorbers to cool the latter during the absorbing periods of the corresponding units; of valve means for controlling the flow of the cooling medium to each of said boiler absorbers, and a bi-metallic thermostat disc in said system, in thermal transfer relation to heat supplied by said heating means to only one of said boiler absorbers and operatively connected to said valve means to control the cooling of each of said boiler absorbers intermittently and in phase relation to the heating thereof, said disc having openings therein to permit passage of the cooling fluid from one side thereof to the other.

3. In refrigerating apparatus of the intermittent absorption type including combined generating and absorbing means, conduit means for a cooling fluid to cool said combined generating and absorbing means, and valve means movable between two operating positions to control the flow of cooling fluid through said conduit means; the combination of a chamber in fluid communication with said conduit means, a bi-metallic snap-action disc in said chamber operatively connected to said valve means and adapted to buckle to either side of a plane under variation of temperature to move said valve means from one operating position to the other and vice versa, and a source of heat exterior to said chamber and operable to heat said disc intermittently.

4. In refrigerating apparatus of the intermittent absorption type including two units operating in phase relation to one another and each having a boiler absorber; the combination with means for heating each of said boiler absorbers intermittently and in phase relation to each other, means for cooling each of said boiler absorbers, and valve means movable between one operating position and another to control the cooling of each of said boiler absorbers intermittently and in phase relation to each other; of thermostat means in thermal transfer relation to the heat supplied by said heating means to only one of said boiler absorbers and adapted to buckle to either side of a plane under variation of temperature to move said valve means from one operating position to the other and vice versa and thereby control the cooling of each of said boiler absorbers intermittently in phase relationship to one another and in phase relation to the heating thereof.

5. In refrigerating apparatus of the intermittent absorption type including combined generating and absorbing means, and conduit means for a cooling fluid to cool said combined generating and absorbing means; the combination of a valve chamber in fluid communication with said conduit means; a snap-action diaphragm dividing said chamber and being perforated to permit passage of the cooling fluid from one side thereof to the other, said diaphragm adapted to buckle to either side of a plane under variation of temperature; valve means in said chamber operatively connected to said diaphragm and movable with the latter from one operating position to another and vice versa to control the flow of cooling fluid through said conduit means intermittently, and heating means arranged outside of said chamber and operating to heat said diaphragm intermittently.

6. In refrigerating apparatus of the intermittent absorption type including a plurality of units operating in phase relation to one another and each having a boiler absorber adapted to be heated intermittently and alternately cooled during the generating and absorbing periods, respectively; the combination with means for heating each of said boiler absorbers intermittently and in phase relation to one another, and a closed circuit conduit for the circulation of a cooling fluid in heat exchange relation with each of said boiler absorbers; of thermostat valve means in thermal transfer relation to the heat supplied to only one of said boiler absorbers for controlling the flow of cooling fluid in heat exchange relation with each of said boiler absorbers intermittently in phase relation to one another and in phase relation to the heating thereof.

NILS ERLAND AF KLEEN.